(12) United States Patent
Sausner

(10) Patent No.: US 6,526,642 B2
(45) Date of Patent: Mar. 4, 2003

(54) METHOD FOR CLAMPING A PIPE WITH A HOSE OR A PIPE WITH THE AID OF A COMPRESSION SLEEVE

(75) Inventor: Andreas Sausner, Frankfurt (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 62 days.

(21) Appl. No.: 09/733,804

(22) Filed: Dec. 7, 2000

(65) Prior Publication Data

US 2001/0004154 A1 Jun. 21, 2001

(30) Foreign Application Priority Data

Dec. 16, 1999 (DE) .......................... 199 60 652

(51) Int. Cl.[7] .................. B23Q 17/00; B21D 39/00; B23P 21/00; B21C 51/00
(52) U.S. Cl. .................. 29/407.05; 29/520; 29/714; 29/715; 72/21.4
(58) Field of Search ................... 29/407.05, 407.09, 29/407.01, 520, 714, 715, 506, 508, 515, 516; 72/14.4, 21.4, 21.3, 402, 702

(56) References Cited

U.S. PATENT DOCUMENTS 5,113,679 A * 5/1992 Ferraro et al. .................. 72/21

FOREIGN PATENT DOCUMENTS

DE 198 19 716 10/1999

* cited by examiner

Primary Examiner—David P. Bryant
Assistant Examiner—John C. Hong
(74) Attorney, Agent, or Firm—Young & Basile, P.C.

(57) ABSTRACT

The invention proposes a method for clamping a pipe with a hose or a pipe with the aid of a compression sleeve, in which the influence of dimensional tolerances of the components on the quality of the compressed connection is significantly reduced. In the method according to the invention, the pressing force between a compression tool and the compression sleeve as well as the advancing distance of the compression tool are determined and evaluated.

32 Claims, 2 Drawing Sheets

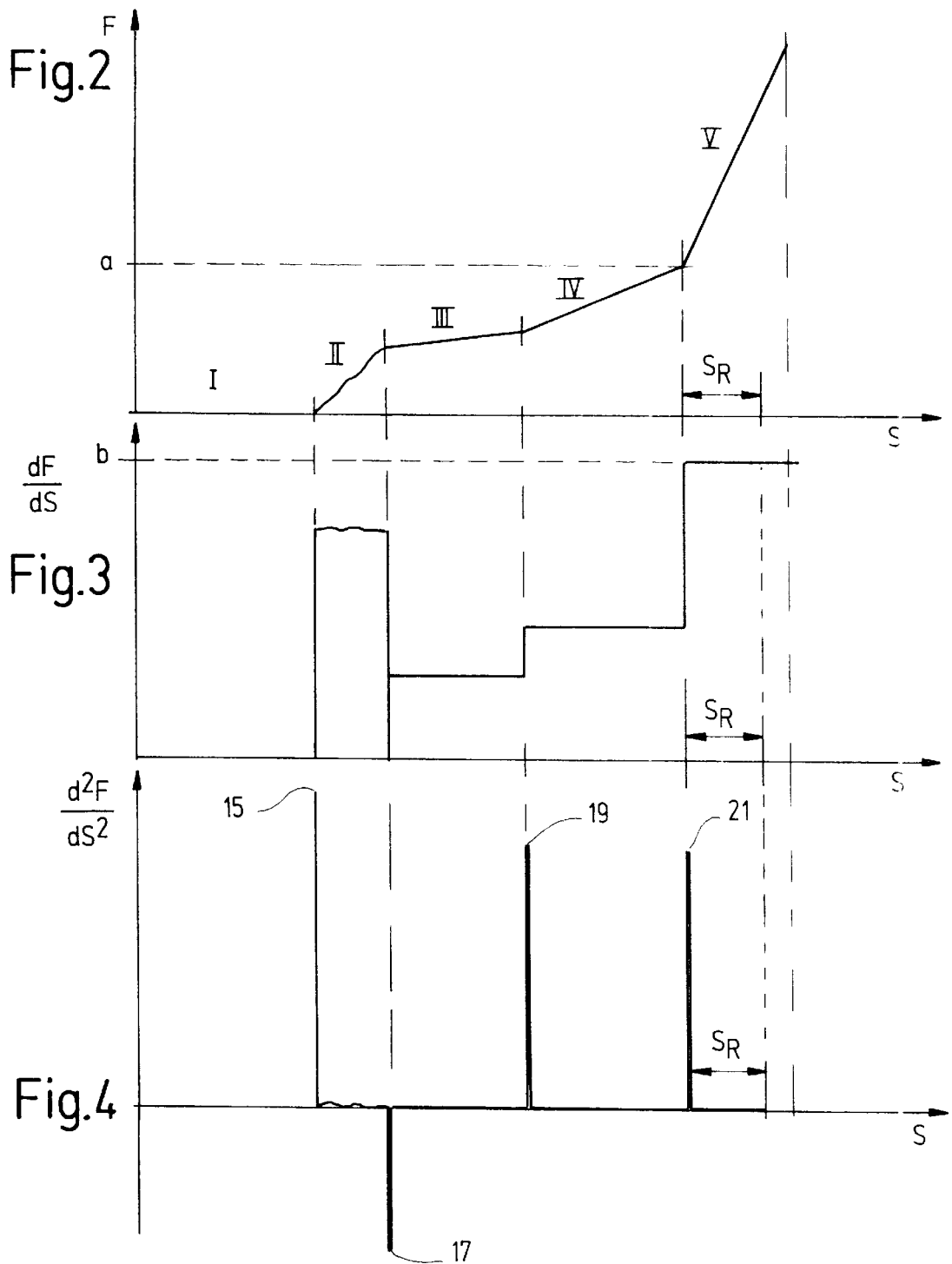

Figure 1A:
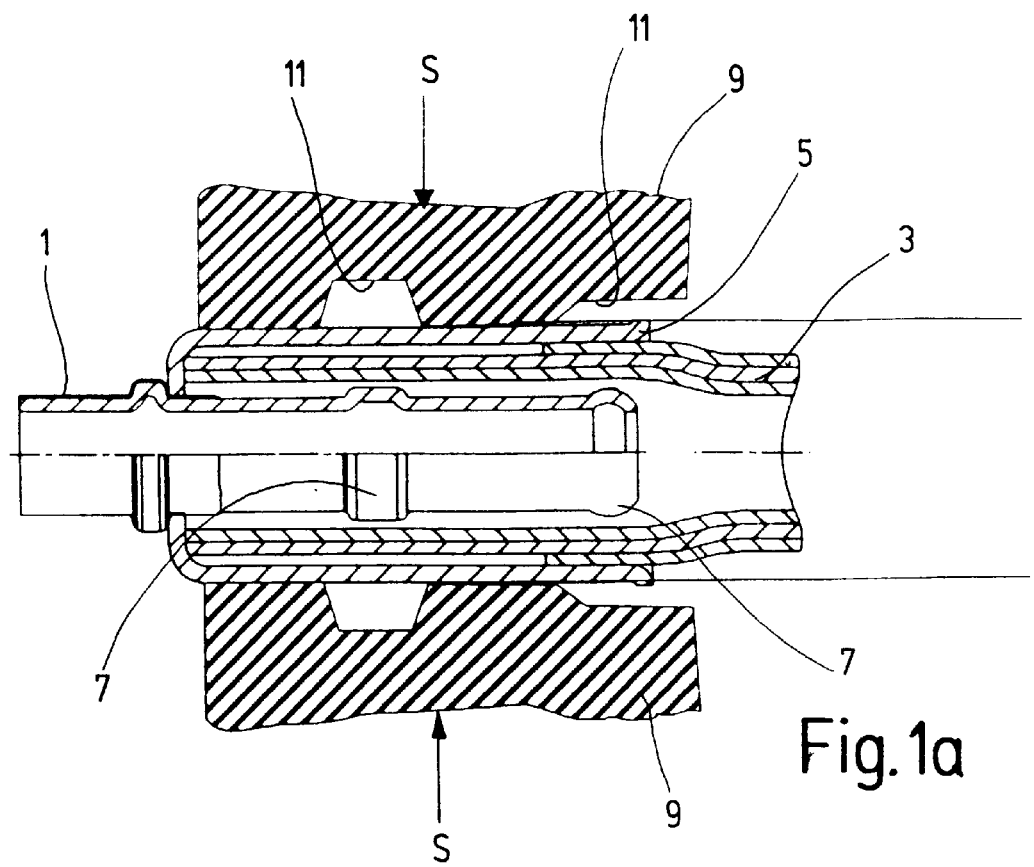

METHOD FOR CLAMPING A PIPE WITH A HOSE OR A PIPE WITH THE AID OF A COMPRESSION SLEEVE

The invention is based on a method for clamping a pipe with a hose or a pipe with the aid of a compression sleeve.

Connections between a hose and a pipe which are produced with the aid of a compression sleeve are, for example, required in braking systems in motor vehicles, hydraulic devices or the like. Since these connections are produced in very large quantities and they sometimes deal with components relevant to the safety of the system, high quality and safety standards must to be met reliably and the costs for producing the compressed connection must be low.

It is known to clamp a pipe with a hose with the aid of a compression sleeve by using a compression tool that acts radially upon the compression sleeve surrounding the outside of the hose. The clamping is stopped as soon as the jaws of the compression tool have reached a certain position. This means that the pipe, the hose and the compression sleeve are pressed together to a certain degree. In this case, diameter and wall thickness variances of the pipe and the hose as well as manufacturing tolerances of the compression sleeve are not taken into consideration. Since each of the three aforementioned components has relatively high manufacturing tolerances, the forces with which the pipe, the hose and the compression sleeve are pressed together and consequently the quality of the connection between the pipe and the hose vary. This requires expensive quality assurance measures and results in relatively high costs due to rejected parts.

The invention aims to make available a method for clamping a pipe with a hose or a pipe with the aid of a compression sleeve which can be easily carried out and still ensures a very high quality standard of the connection between the pipe and the hose.

According to the invention, this objective is attained with a method for clamping a pipe and a hose or a second pipe with the aid of a compression sleeve high, in which
    a compression tool that acts upon the compression sleeve in the radial direction is advanced,
    the radial force F between the compression tool and the compression sleeve is determined, and
    the compression tool is advanced by a residual compression distance $s_R$ after a predetermined value a for the radial force F is reached.

This method provides the advantage that a certain radial force between the compression tool and the compression sleeve is always exerted before the compression tool is advanced by a residual compression distance $s_R$, independently of the dimensional tolerances of the pipe, the hose and the compression sleeve. The residual compression distance $s_R$ serves for also ensuring a defined deformation of the pipe so that a defined clamping between the compression sleeve, the hose and the pipe is achieved after removing the compression tool. Consequently, the pressing force between the compression sleeve, the hose and the pipe is almost independent of the dimensional tolerances of the pipe, the hose and the compression sleeve. This results in decisive improvement in the quality, lower rejection ratios and consequently more favorable manufacturing costs.

According to the invention, the objective mentioned above is also attained with a method for clamping a pipe and a hose or a second pipe with the aid of a compression sleeve, in which
    a compression tool that acts upon the compression sleeve in the radial direction is advanced,
    the radial force F between the compression tool and the compression sleeve is determined,
    the distance s of the compression tool in the radial direction is determined,
    the first derivative dF/ds of the radial force F is calculated with respect to the distance s, and
    the compression tool is advanced by a residual compression distance $s_R$ after a predetermined value b of the first derivative dF/ds of the radial force with respect to the distance s is reached.

This method provides the advantage that the condition of the compressed connection can be determined even better due to the step-like progression of the first derivative of the radial force F with respect to the advance distance s before advancing the compression tool by the residual compression distance $s_R$.

According to the invention, the objective mentioned above is also attained with a method for clamping a pipe with a hose or a second pipe with the aid of a compression sleeve, in which
    a compression tool that acts upon the compression sleeve in the radial direction is advanced,
    the radial force F between the compression tool and the compression sleeve is determined,
    the distance s of the compression tool in the radial direction is determined,
    the second derivative $d^2F/ds^2$ of the radial force F is calculated with respect to the distance s and
    the compression tool is advanced by a residual compression distance $s_R$ once the number of peaks of the second derivative $d^2F/ds^2$ of the radial force F with respect to the distance (s) is equal to a predetermined number c.

The second derivative $d^2F/ds^2$ essentially contains several peaks and is otherwise approximately equal to zero. Consequently, all that is required is to determine the number of peaks in order to ascertain the degree to which the compression sleeve, the hose and the pipe are already compressed. For example, as soon as it is determined that, for example, the pipe begins to deform, the compression tool is advanced by the residual compression distance $s_R$. This means that this method also ensures that a defined compression between the pipe, the hose and the compression sleeve is achieved after the compression tool is removed.

According to the invention, the objective mentioned above is also attained with a method for clamping a pipe with a hose or a second pipe with the aid of a compression sleeve, in which
    a compression tool that acts upon the compression sleeve in the radial direction is advanced,
    the radial force F between the compression tool and the compression sleeve is determined,
    the distance s of the compression tool in the radial direction is determined,
    the first derivative dF/ds of the radial force F is calculated with respect to the distance s,
    the second derivative $d^2F/ds^2$ of the radial force F is calculated with respect to the distance s, and
    the compression tool is advanced by a residual compression distance $s_R$ after a predetermined value a of the radial force F is reached, after a predetermined value b of the first derivative dF/ds of the radial force with respect to the distance s is reached, and/or after the number of peaks of the second derivative $d^2F/ds^2$ of the radial force F with respect to the distance s is equal to a predetermined number c.

This method provides the advantage that the progression of the compressed connection between the compression sleeve, the hose and the pipe is measured in three different ways. Consequently, redundant information is available. This redundancy can be used for eliminating possible outliers or the like during the determination of the values a, b or c.

According to another alternative embodiment of this method, the compression tool is only advanced by the residual compression distance when two of the three values a, b or c are reached, so that the condition of the compressed connection is determined with superior reliability.

In one variation of the method according to the invention, it is proposed that an error message is generated if the other value(s) is/are not reached during the advance. This error message indicates that the compressed connection between the compression sleeve, the hose and the pipe may not have been carried out in accordance with the pertinent specifications. Consequently, this method provides the option of carrying out a first quality control during the compression process and to reject the connections between the hose and the pipe which have not passed this first quality test. Subsequently, it would be possible, for example, to subject these rejected connections to a particularly detailed quality control in order to determine whether the connection is actually defective or adequate.

The invention also proposes that the residual compression distance $s_R$ is smaller than 0.6 mm, in particular, 0.45 mm. Due to this measure, it is ensured that an optimal connection is achieved, for example, when connecting pipes and hoses in braking systems in motor vehicles.

According to one variation of the invention, c=4 so that the centering of the compression sleeve, the plastic deformation of the compression sleeve and the compression of the hose or its outer cover is reliably completed before advancing by the residual compression distance $s_R$.

The invention also proposes that the first peak is a positive-signed value, the second peak is a negative-signed value, and the following peaks are positive-signed values so that the negative-value peak makes it possible to reliably ascertain that the centering of the compression sleeve is completed, i.e., the determination of the condition of the compressed connection is additionally improved.

Additional advantages and advantageous embodiments of the invention result from the drawing, the following description and the claims. Shown are:

FIG. 1, a pipe with a hose and a compression sleeve as well as a compression tool in the form of a cross section;

FIG. 2, the progression of the force F with respect to the distance s;

FIG. 3, the first derivative of the radial force F with respect to the distance s, and FIG. 4, the second derivative of the radial force F with respect to the distance s.

FIG. 1a shows a first embodiment of a pipe 1, a hose 3 and a compression sleeve 5 before the compression process. This figure indicates that the diameter of the pipe 1 varies at the locations 7 in order to improve the positive-fit connection between the pipe 1 and the hose 3 or the compression sleeve 5 in the compressed condition. The pipe 1, the hose 3 and the compression sleeve 5 are compressed by means of a schematically illustrated compression tool 9 by moving the jaws of the compression tool 9 toward one another in the direction of the arrow s. The jaws of the compression tool 9 contain depressions 11 which correspond to the diameter variations 7 of the pipe 1. The radial force F exerted upon the compression sleeve 5, the hose 3 and the pipe 1 by the compression tool 9 during the compression of the three aforementioned components also acts in the direction of the arrow s.

Figure 1B:
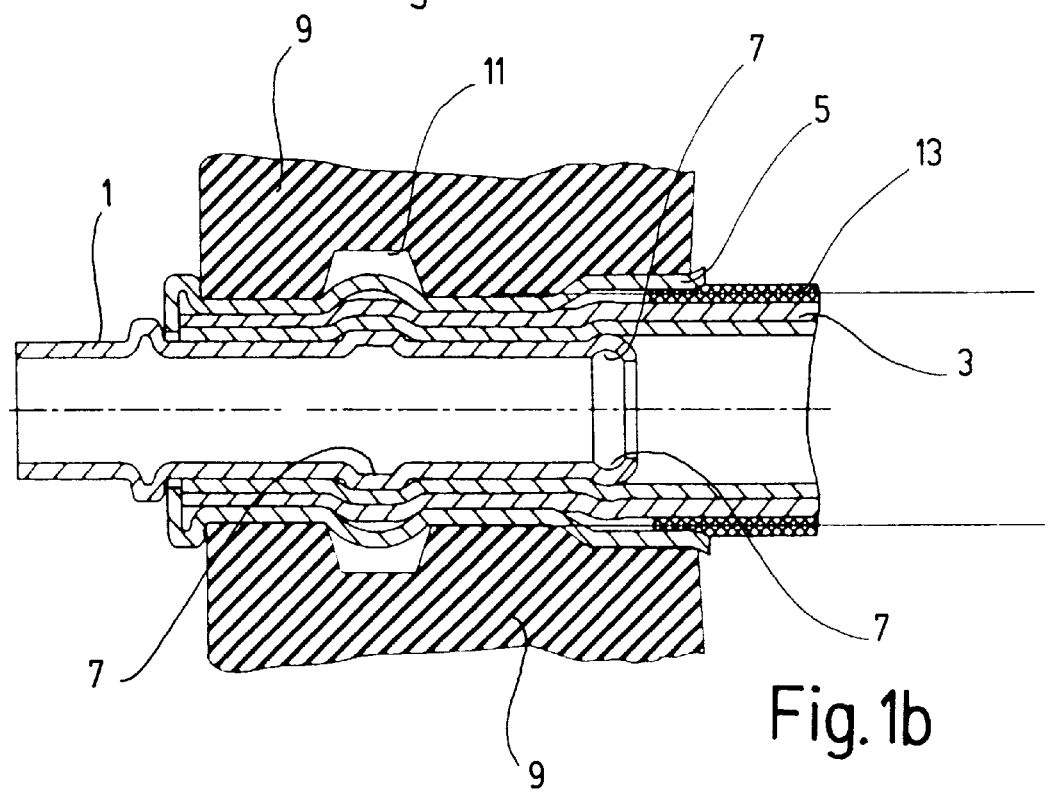

FIG. 1b shows another embodiment in the compressed condition. The hose 3 consists of only two layers and thus, the hose features a fabric 13 on its outer diameter. FIG. 1b clearly indicates that a positive-fit connection between the pipe 1, the hose 3 and the compression sleeve 5 is achieved in the compressed condition due to the diameter variations 7.

FIG. 2 shows the progression of the radial force F with respect to the distance s. The distance s can be divided into different sections I–V. In section I, the jaws of the compression tool 9 do not yet contact the compression sleeve 5, i.e., a radial force F is not yet exerted. In section II, the compression sleeve 5 is deformed and consequently centered relative to the hose 3 and the pipe 1. In section III, a plastic deformation of the compression sleeve 5 takes place. Since the material of the compression sleeve 5 begins to deform, the increase in the radial force F in section III is smaller than in section II, during which a primarily elastic deformation takes place.

Section IV is characterized by the fact that, in addition to the plastic deformation of the compression sleeve 5, a compression of the hose 3 and, if applicable, the fabric 13 takes place. Since a decompression of the hose 3 and, if applicable, the fabric 13 takes place in addition to the plastic deformation of decompression sleeve 5, the increase in the radial force F in section IV is greater than in section III. Section V is characterized by the fact that a deformation of the pipe 1 takes place in addition to the plastic deformation of the compression sleeve 5 and the decompression of the hose 3 and, if applicable, the fabric 13. Consequently, the increase in the radial force F in the section V is greater than in the previously described sections I–IV.

The previously described sections I–V occur during each compression process of a compression sleeve 5, a hose 3 and a pipe 1 according to FIG. 1. With respect to the quality of the compressed connection, it is important that the compression tool 9 is advanced by a residual compression distance $s_R$ after the completion of section IV. Once this takes place, it is ensured that the connection between the hose 3 and the pipe 5 [sic; 1] has the required quality.

In other compressed connections—e.g., between two pipes—it may not be possible to divide the compression process into the sections I–V, but rather into other sections. In this case, the determination of the values a, b and/or c must be correspondingly adapted.

In contrast to the methods known from the state of the art, in which a fixed advancing distance is predetermined, the method according to the invention makes it possible to ensure with much higher reliability that a deformation of the pipe 1 actually takes place due to the compression. The essential reason for this fact is that the dimensional tolerances of the compression sleeve 5, the hose 3 and the pipe 1 do not have to be added.

FIG. 3 shows the first derivative dF/ds of the radial force F with respect to the distance s. One can clearly ascertain that a characteristic value can be assigned to each section I–V. As soon as the compression tool 9 is advanced beyond the section IV, the first derivative dF/ds of the radial force F assumes a significantly higher value after the advancing distance s. This value of the first derivative dF/ds can be used for determining the beginning of the residual compression distance $s_R$.

FIG. 4 shows the second derivative $d^2F/ds^2$ of the radial force F with respect to the distance s. FIG. 4 clearly indicates that the transition from one of the sections I–V to the next section is characterized by a peak 15, 17, 19 and 21. The beginning of the residual compression distance $s_R$ can be very easily and reliably determined by counting the peaks 15, 17, 19 and 21. In FIG. 4, the second peak 17 is a negative-signed value while the other peaks 15, 19 and 21 are positive-signed values. This change in the signs of the values can also be used for determining the beginning of the residual compression distance $s_R$. This may, for example, be realized in such a way that after the detection of the peak 17, two additional peaks 19 and 21 must be detected before advancing the compression tool by the residual compression distance $s_R$.

All characteristics disclosed in the description, the following claims and the drawings may be essential for the invention individually as well as in arbitrary combinations.

What is claimed is:

1. A method for producing a compressed connection between a pipe with a second cylindrical member with the aid of a compression sleeve, characterized by the steps of:
    advancing a compression tool that acts upon the compression sleeve in the radial direction;
    determining a radial force F between the compression tool and the compression sleeve; and
    advancing the compression tool by a residual compression distance $s_R$ after a predetermined value a of the radial force F is reached.

2. A method for producing a compressed connection between a pipe with at least a second cylindrical member with the aid of a compression sleeve, characterized by the steps of:
    advancing a compression tool that acts upon the compression sleeve in the radial direction;
    determining a radial force F between the compression tool and the compression sleeve;
    determining a distance s of the compression tool in the radial direction;
    calculating a first derivative dF/ds of the radial force F with respect to the distance s; and
    advancing the compression tool by a residual compression distance $s_R$ after a predetermined value b of the first derivative dF/ds of the radial force F with respect to the distance s is reached.

3. The method according to claim 2 characterized in that the residual compression distance $s_R$ is smaller than 0.6 mm.

4. The method according to claim 2 characterized in that the residual compression distance $s_R$ is smaller than 0.45 mm.

5. A method for producing a compressed connection between a pipe with one of a second cylindrical member with the aid of a compression sleeve, characterized by the steps of:
    advancing a compression tool that acts upon the compression sleeve in the radial direction;
    determining a radial force F between the compression tool and the compression sleeve;
    determining a distance s of the compression tool in the radial direction;
    calculating a second derivative $d^2F/ds^2$ of the radial force F with respect to the distance s; and
    advancing the compression tool by a residual compression distance $s_R$ when a number of peaks of the second derivative $d^2F/ds^2$ of the radial force F with respect to the distance s is equal to a predetermined number c.

6. The method according to claim 5, characterized by the fact that the predetermined value c is equal to 4.

7. The method according to claim 5 characterized in that the second derivative $d^2F/ds^2$ of the radial force F with respect to the distance s has at least three peaks, wherein a first peak is a positive-signed value, a second peak is a negative-signed value, and subsequent peaks are positive-signed values.

8. The method according to claim 5 characterized in that the residual compression distance $s_R$ is smaller than 0.6 mm.

9. The method according to claim 5 characterized in that the residual compression distance $s_R$ is smaller than 0.45 mm.

10. A method for producing a compressed connection between a pipe with at least a second cylindrical member with the aid of a compression sleeve, characterized by the steps of:
    advancing a compression tool that acts upon the compression sleeve in the radial direction;
    determining a radial force F between the compression tool and the compression sleeve;
    determining a distance s of the compression tool in the radial direction;
    calculating a first derivative dF/ds of the radial force F with respect to the distance s;
    calculating a second derivative $d^2F/ds^2$ of the radial force F with respect to the distance s; and
    advancing the compression tool by a residual compression distance $s_R$ only after at least one predetermined value is reached from a group of predetermined values consisting of a predetermined value a of the radial force F, a predetermined value b of the first derivative dF/ds of the radial force with respect to the distance s, and a predetermined value c equal to a number of peaks of the second derivative $d^2F/ds^2$ of the radial force F with respect to the distance s.

11. The method according to claim 10 further comprising the step of generating an error message if none of required values a, b and c are reached during the advance of the compression tool.

12. The method according to claim 10 characterized in that the second derivative $d^2F/ds^2$ of the radial force F with respect to the distance s has at least three peaks, wherein a first peak is a positive-signed value, a second peak is a negative-signed value, and subsequent peaks are positive-signed values.

13. The method according to claim 10 characterized in that the residual compression distance $s_R$ is smaller than 0.6 mm.

14. The method according to claim 10 characterized in that the residual compression distance $s_R$ is smaller than 0.45 mm.

15. The method according to claim 10, wherein predetermined value c is equal to 4.

16. The method according to claim 11, wherein the predetermined value c is equal to 4.

17. A method for producing a compressed connection between a pipe with a second cylindrical member with the aid of a compression sleeve, characterized by the steps of:
    advancing a compression tool that acts upon the compression sleeve in the radial direction;
    determining a radial force F between the compression tool and the compression sleeve; and
    advancing the compression tool by a residual compression distance $s_R$ after a predetermined value a of the radial force F is reached, wherein the residual compression distance $s_R$ is smaller than 0.6 mm.

18. The method according to claim 17, wherein the predetermined value c is equal to 4.

19. A method for producing a compressed connection between a pipe with a second cylindrical member with the aid of a compression sleeve, characterized by the steps of:

advancing a compression tool that acts upon the compression sleeve in the radial direction;

determining a radial force F between the compression tool and the compression sleeve; and advancing the compression tool by a residual compression distance $s_R$ after a predetermined value a of the radial force F is reached, wherein the residual compression distance $s_R$ is smaller than 0.45 mm.

20. A method for producing a compressed connection between a pipe and another cylindrical member with the aid of a compression sleeve comprising the steps of:

advancing a compression tool for acting on the compression sleeve in the radial direction;

determining a radial force F between the compression tool and the compression sleeve while advancing the compression tool; and advancing the compression tool by a residual compression distance $s_R$ after a predetermined value is reached.

21. The method of claim 20, wherein the predetermined value is a predetermined value a of the radial force F.

22. The method of claim 20 further comprising the step of the residual compression distance $s_R$ is smaller than 0.6 mm.

23. The method of claim 20 further comprising the step of the residual compression distance $s_R$ is smaller than 0.45 mm.

24. The method of claim 20 further comprising the steps of:

determining a distance s of advancing movement of the compression tool in the radial direction;

calculating a first derivative dF/ds of the radial force F with respect to the distance s; and the advancing step of the compression tool by a residual compression distance $s_R$ after a predetermined value is reached, where the predetermined value is a predetermined value b of the first derivative dF/ds of the radial force F with respect to the distance s.

25. The method of claim 20 further comprising the steps of:

determining a distance s of advancing movement of the compression tool in the radial direction;

calculating a second derivative $d^2F/ds^2$ of the radial force F with respect to the distance s; and the advancing step of the compression tool by a residual compression distance $s_R$ when a predetermined value is reached, where the predetermined value is a predetermined value c equal to a number of peaks of the second derivative $d^2F/ds^2$ of the radial force F with respect to the distance s.

26. The method of claim 25 further comprising the step of the value of c is equal to 4.

27. The method of claim 25 further comprising the step of the second derivative $d^2F/ds^2$ of the radial force F with respect to the distance s having at least three peaks, wherein a first peak is a positive-signed value, a second peak is a negative-signed value, and subsequent peaks are positive-signed values.

28. The method of claim 20 further comprising the steps of:

determining a distance s of advancing movement of the compression tool in the radial direction;

calculating a first derivative dF/ds of the radial force F with respect to the distance s;

calculating a second derivative $d^2F/ds^2$ of the radial force F with respect to the distance s; and the advancing step of the compression tool by a residual compression distance $s_R$ only after at least one predetermined value is reached, where the at least one predetermined value is selected from a group of predetermined values consisting of a predetermined value a of the radial force F, a predetermined value b of the first derivative dF/ds of the radial force F with respect to the distance s, and a predetermined value c equal to a number of peaks of the second derivative $d^2F/ds^2$ of the radial force F with respect to the distance s.

29. The method of claim 28 further comprising the step of generating an error message if none of the predetermined values a, b and c are reached during the advance of the compression tool.

30. The method of claim 29 further comprising the step of the predetermined value c is equal to 4.

31. The method of claim 28 further comprising the step of the predetermined value c is equal to 4.

32. The method of claim 28 further comprising the step of the second derivative $d^2F/ds^2$ of the radial force F with respect to the distance s having at least three peaks, wherein the first peak is a positive-signed value, the second peak is a negative-signed value, and the subsequent peaks are positive-signed values.

* * * * *